June 24, 1930.  J. F. ARTHUR  1,768,095
TUBE JOINT
Filed March 31, 1928
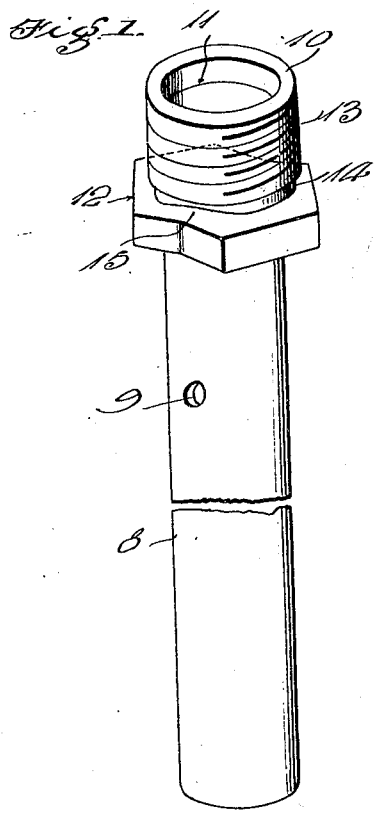
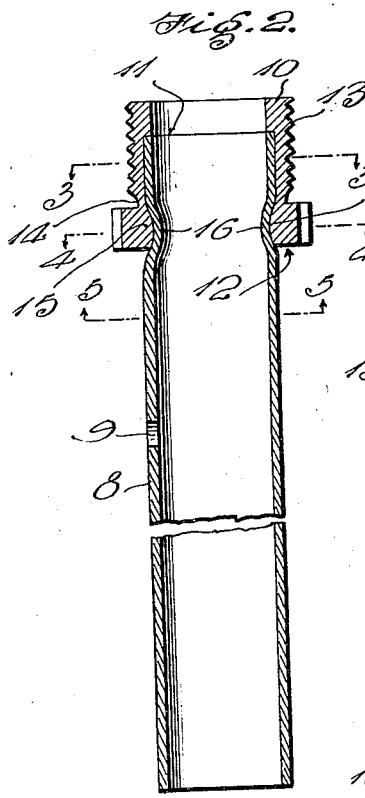
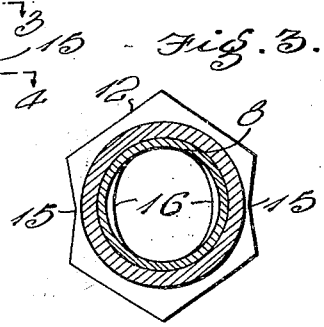
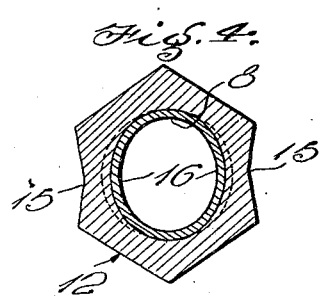
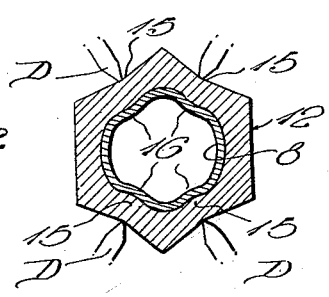
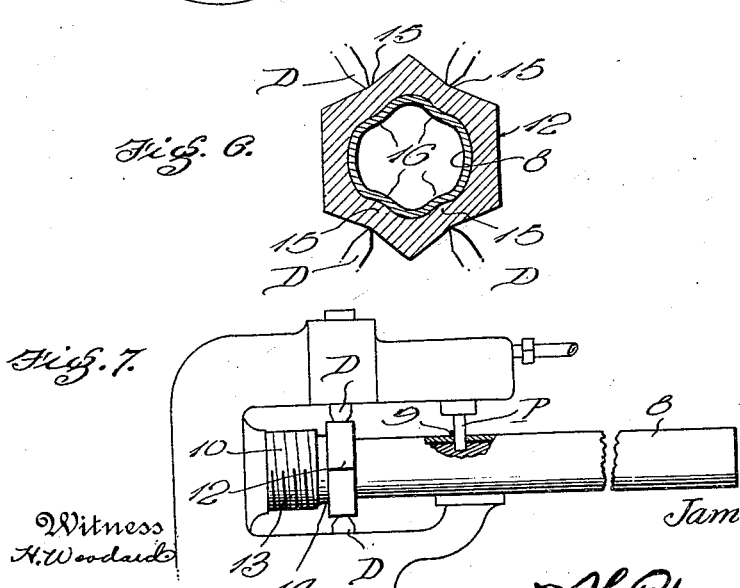
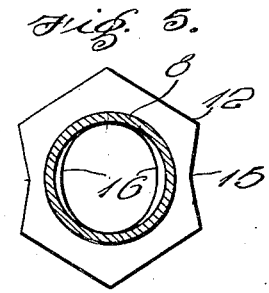
Inventor
James F. Arthur Patented June 24, 1930

1,768,095

UNITED STATES PATENT OFFICE

JAMES F. ARTHUR, OF DICKSON, PENNSYLVANIA

TUBE JOINT

Application filed March 31, 1928. Serial No. 266,394.

The invention relates to circulating tubes for range boilers and the like. One form of tube comonly used, has one of its ends secured in an externally threaded bushing. Heretofore, numerous ways have been devised for connecting the bushing with the tube without the necessity of soldering or brazing, but it is the object of the present invention to provide a new and improved way of accomplishing this end, in a less expensive manner, yet in one which will be equally as advantageous as those previously employed.

With the foregoing in view, the invention resides in the novel subject matter hereinafter described and claimed, description being accomplished by reference to the accompanying drawing.

Fig. 1 is a perspective view of a circulating tube constructed in accordance with the invention.

Fig. 2 is a vertical longitudinal sectional view.

Figs. 3, 4 and 5 are transverse sections on the correspondingly numbered lines of Fig. 2.

Fig. 6 is a transverse sectional view showing a somewhat modified form of construction.

Fig. 7 is a side elevation partly broken away and in section illustrating certain steps hereinafter described, utilized in producing the tube.

In the drawing above briefly described, 8 denotes a thin metal tube preferably of brass and formed with the usual vent opening 9 near its upper end. Fitting around this end of the tube 8, is a cylindrical bushing 10 of brass or the like, said bushing being provided if desired with an internal shoulder 11 to abut the upper end of the tube. This bushing is thicker than the tube 8 and is provided at its lower end with a wrench-engaging head 12. Above this head, the bushing is externally threaded as indicated at 13, and between the threaded portion and the head, the bushing is externally grooved to provide it with a thinned circumferential portion 14. At one or more points, the head 12 is inwardly distorted as at 15, thus providing the tube with a similar distortion 16 engaging each of said distortions 15. These interfitting distortions 15—16, effectively hold the tube and the bushing in assembled relations without the necessity of any other fastening means.

As manufactured, the tube 8 is of truly cylindrical form and the interior of the bushing 10 is of similar formation. The tube is inserted into the bushing and then, by the use of appropriate dies or the like D, the required number of distortions are forced into the bushing, and these distortions produce the tube distortions 16. If desired, as indicated in Fig. 7 a press may be employed to distort the tube and the bushing, and this press may be provided with an appropriate punch P to form the opening 9 simultaneously with the distorting operation.

Attention is invited to the fact that due to the thinned portion 14, connecting the head 12 with the remainder of the bushing, the distortion or distortions 15 will not spread to the threaded portion 13 of the bushing and hence, the latter is maintained in its cylindrical form.

Excellent results are obtainable from the details disclosed and they are preferably followed. However, within the scope of the invention as claimed, variations may be made.

I claim:

1. In a joint, a metal tube, and a metal bushing around one end of said tube provided with an enlarged head for engagement with a wrench, said head having an inward distortion projecting into a similar distortion in said tube to hold tube and bushing in assembled relation.

2. In a joint, a metal tube, and a metal bushing around one end thereof, said bushing having an enlarged flat-sided wrench-engaging head at one end, external screw threads extending to its other end, and a thinned circumferential portion connecting said head with the threaded portion of the bushing, said head having an inward distortion projecting into a similar distortion in the tube, thereby holding tube and bushing in assembled relation, said thinned portion of the bushing preventing spreading of said distortion to said threaded portion when forming said distortion.

In testimony whereof I have hereunto affixed my signature.

JAMES F. ARTHUR.